Patented Apr. 22, 1947

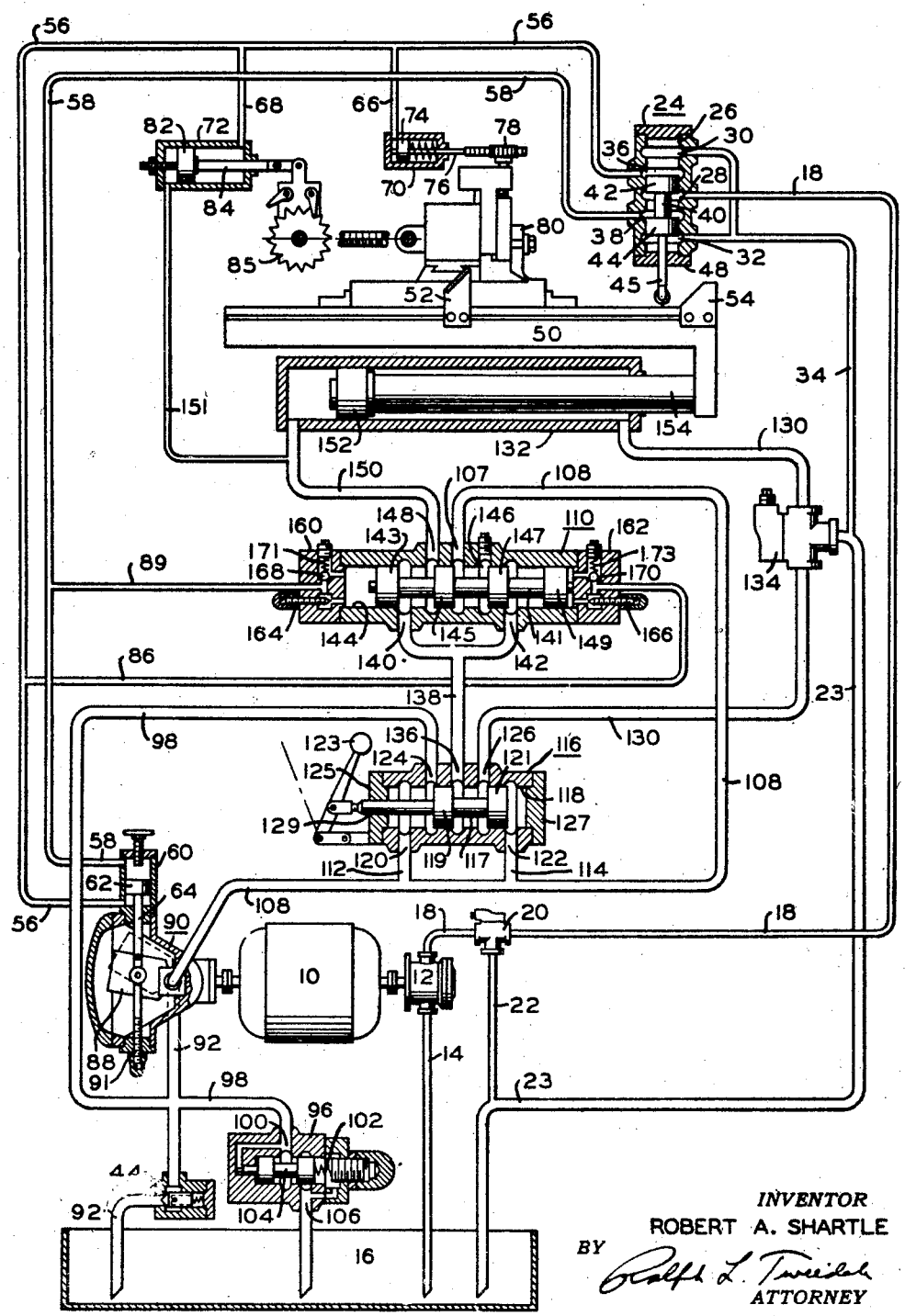

2,419,374

UNITED STATES PATENT OFFICE 2,419,374

POWER TRANSMISSION

Robert A. Shartle, Rockford, Ill., assignor to Vickers Incorporated, Detroit, Mich., a corporation of Michigan Application October 30, 1941, Serial No. 417,087

6 Claims. (Cl. 60—52)

1

This invention relates to power transmissions, particularly to those of the type comprising two or more fluid pressure energy translating devices, one of which may function as a pump and another as a fluid motor.

The invention is more particularly concerned with a power transmission system for driving an alternately reversing load device, for example, the movable slide of a machine tool such as a planer or shaper, and particularly one having considerable inertia. In systems applied to this class of service, it is important that the means for stopping the slide at will be effective to brake the momentum promptly to prevent overtravel. This result has been achieved in previous circuits by somewhat complex apparatus, and it is an object of the present invention to provide by means of a simplified circuit a power transmission system of the character described which provides safe and positive stopping with a minimum of overtravel and with considerable simplification of the apparatus used.

It is also an object to provide in a system of this character an overload protective valve which is effective during the braking operation and to so arrange a single such valve in the circuit that it is effective to brake the momentum of the slide regardless of which direction the slide is moving.

A further object is to provide a system of this character wherein a single relief valve acts not only as a pressure limiting device during braking but is also so located in the circuit as to afford the normal supply pressure limiting action during operation.

Further objects and advantages of the present invention will be apparent from the following description, reference being had to the accompanying drawing wherein a preferred form of the present invention is clearly shown.

In the drawing the single figure is a diagrammatic view of a power transmission system incorporating a preferred form of the present invention.

There is indicated at 10 a suitable prime mover, such as an electric motor, adapted to drive two hydraulic pumps simultaneously, one of which, attached to the righthand end of motor 10, is a small auxiliary constant displacement pump 12 which supplies pilot pressure for the circuit. Pump 12 withdraws fluid from a tank 16 through a suction conduit 14 and delivers the same to a delivery conduit 18. The latter has a relief valve 20 of conventional construction for bypassing oil to the tank 16 through conduits 22 and 23 whenever a predetermined pressure is exceeded in the delivery conduit 18.

Conduit 18 extends to a pilot directional four-way valve 24 which comprises a main body having a longitudinal bore 26 which is provided with a plurality of ports arranged along its length, of which 28 is a pressure port, 36 and 38 are cylinder ports, and 30 and 32 are tank ports which communicate with tank 16 through conduits 34 and 23. For controlling the communication between the various ports, there is mounted in bore 26 a slidable spool 40 which comprises a stem having two solid lands 42 and 44 and a valve plunger 45 which extends downward through an end cap 48 to a reciprocating mechanism 50 onto which are attached adjustable cams 52 and 54 for the operation thereof. Slide 50 is moved by a rod 154 which is attached to piston 152 mounted in cylinder 132. The cross section area of rod 154 is preferably one-half the area of the left end of piston 152.

From ports 36 and 38 of pilot valve 24 conduits 56 and 58 extend to the rod and head ends, respectively, of an automatic stroking cylinder 60, attached to pump 90 hereinafter described, containing a movable piston 62 having a rod 64 which shifts a yoke 88, thus regulating the volume of fluid flow of the pump 90. Its minimum flow is determined by an adjusting screw 91 which is set to a point above the neutral position to prevent short stroking the pump 90 to zero displacement.

Conduit 56 has branch conduits 66 and 68, of which 66 leads to a cylinder 70 which contains a slidable piston 74, spring returned, and a rod 76 attached thereto which meshes with a gear 78 to lift tool 80 during the return stroke, while 68 leads to the rod end of a cylinder 72 which comprises a movable piston 82 and a rod 84 to operate the cross feed 85 which moves tool 80 across the work. Conduit 56 has also a branch conduit 86 leading to the right end of valve 110, while the left end of valve 110 communicates with conduit 58 through branch conduit 89.

Pump 90, attached to the lefthand end of the motor 10, is a piston type variable delivery pump provided with an automatic stroke regulator 60, hereinbefore described, which increases the volume of flow during the return stroke and decreases it during the feed stroke. Pump 90 has a suction conduit 92 which has mounted therein a check valve 94 for allowing liquid to be withdrawn from the tank 16. Suction conduit 92 also communicates through conduit 98 with a pressure responsive valve 96 which permits excess fluid to be discharged to tank while maintaining a predetermined back pressure in conduit 92.

Valve 96 interrupts the flow of fluid to the tank 16 until a predetermined pressure for which the valve spring 102 has been adjusted has been reached. This pressure, transmitted to the left of spool 104, will cause it to move to the right, connecting ports 100 and 106, thus bypassing to tank 16 whatever oil is required to cause pressure in port 100 to again fall below the setting of the spring 102. The latter will then urge spool 104 to the left, blocking ports 100 and 106, as is well known in the art.

Pump 90 withdraws liquid from the tank 16 through suction conduit 92 and delivers the same to a delivery conduit 108 which extends to the reversing valve 110, entering port 107. Branch conduits 112 and 114 lead to a manually operated start and stop valve 116. The latter comprises a main body having a longitudinal bore 118 which is provided with annular ports arranged along its length, communication between which is controlled by a spool 117 which comprises a stem having two lands 119 and 121. The left end of the spool 117 has secured thereto an operating plunger 129 which is attached to a manually operated lever 123. End caps 125 and 127 close both ends of the valve 116, the former cap closely enveloping the plunger 129, forming a liquid tight fit.

Ports 120 and 122 of valve 116 communicate with the inlet conduit 108 through conduits 112 and 114, respectively, while port 124 is connected by a conduit 98 which leads to the suction side of pump 90. Port 126, a cylinder port, is connected by a conduit 130 which leads to the rod end of a cylinder 132, passing through a relief valve 134. The latter is of conventional construction for bypassing oil to tank 16 through conduit 23 whenever a predetermined pressure is exceeded in conduit 130. Relief valve 134 also functions as a safety valve during the braking period, hereinafter described, to relieve excess pressure caused by the inertia of the slide 50 when it is suddenly stopped.

Port 136 of valve 116 is connected by a conduit 138 which extends therefrom, bifurcates and enters valve 110 through ports 140 and 142. Valve 110 comprises a main body having a longitudinal bore 144 provided with annular ports arranged along its length, of which 146 is a plugged port and 148 a cylinder port which communicates with the head end of the cylinder 132 through a conduit 150. The latter has an auxiliary conduit 151 leading to the head end of the cross feed cylinder 72, hereinbefore described. Communication between the various ports is controlled by a hydraulically operated spool 141 which comprises a stem having four lands 143, 145, 147 and 149 thereon.

Valve 110 is provided with end caps 160 and 162 which contain small metering valves to control the speed of shifting of the valve spool 141. The metering valves consist of ball check valves 168 and 170, held in place by light springs 171 and 173 and metering pins 164 and 166, respectively, which can be adjusted from zero to free flow. The oil enters the valve 110 through a ball check valve on one side, and as oil leaves the other side it exerts pressure against the ball check valve closing that port, causing the oil to pass through the metering pin. By controlling the flow of the exhausting oil from the valve 110, the speed of the spool 141 is controlled thereby, eliminating the impact caused by the too rapid shift of the valve spool 141.

In operation, while pumps 90 and 12 are being driven by the electric motor 10, oil is withdrawn from the tank 16 through suction conduits 92 and 14 and delivered to delivery conduits 108 and 18, respectively. Conduit 18 of pump 12 directs the fluid to the pilot valve 24, which, it may be assumed, is in the position shown. Since valve member 141 and stroking piston 62 are already moved to the end of their respective strokes, no fluid can escape through conduit 58, so the full pump delivery is bypassed to the tank 16 through relief valve 20 and conduits 22 and 23. While conduit 108 of pump 90 directs the liquid to valve 110, the spool being to the right connecting ports 107 and 146, no liquid can escape through this path, and liquid is caused to enter valve 116 through conduit 112. Ports 120 and 124 being connected, the liquid is directed to conduit 98 which communicates with the suction conduit 92, thus causing the liquid to circulate at no pressure.

Prior to beginning the operation, with all parts in the position illustrated, pilot valve 24 connects pressure port 28 with cylinder port 38 and cylinder port 36 with tank port 30. When the lever 123 of the stop and start valve 116 is shifted to the left to start the operation, it connects port 136 with port 124 and pressure port 122 with cylinder port 126.

Pilot pressure in conduit 58 is maintained in the head end of the stroking cylinder 60 of pump 90, holding the yoke 88 in its feed position, as illustrated, also entering branch conduit 89, holding valve 110 in the position shown.

The operating pressure from pump 90 is now directed through conduit 108 to valve 110, being stopped therein by the plugged port 146, and it enters valve 116 through conduit 114. Ports 122 and 126 being connected, the liquid is directed through conduit 130 to the rod end of cylinder 132, causing the piston 152 to move to the left. The discharging liquid from the head end of the cylinder 132 is exhausted through conduit 150, ports 148 and 140 of valve 110, conduit 138, ports 136 and 124 of valve 116, and conduit 98, which leads to the suction side of the pump 90. As the pressure responsive valve 96 sets up a back pressure therein, the liquid is caused to flow through branch conduit 151 of conduct 150 to the head end of the feed cylinder 72, causing tool 80 to be moved across the work, setting it in a position to cut. The excess oil not required for prefilling the pump 90 will be bypassed over the pressure responsive valve 96, as only one-half of the liquid returned from the head end of the cylinder 132 is delivered to the rod end thereof.

If the need of stopping the slide 50 arises during this feed cycle, lever 123 of valve 116 is shifted to the stop position, illustrated, connecting port 120 with port 124, directing the pump delivery to conduit 98, causing it to simply circulate, while port 136 connects with port 126, diverting the discharging flow from conduit 138 to conduit 130. As this oil amounts to approximately twice the amount of the oil that can be accommodated in conduit 130, pressure will immediately build up in conduit 130 to a high value limited by the setting of relief valve 134, causing the table 50 to promptly stop.

When the slide 50 reaches the end of its cutting stroke, an adjustable cam 54 mounted thereon will shift the pilot valve 24 to the return position, connecting pressure port 28 with cylinder port 36 and cylinder port 38 with tank port 32, directing the pilot pressure through conduit 56 to the rod end of the stroking cylinder 60 of pump 90, shifting the yoke 88 to its maximum position. Simultaneously, the pilot pressure enters branch conduits 66 and 68 forcing back piston 74 of cylinder 70, lifting tool 80 out of the path of the work, and returning piston 82 of cylinder 72 to its start position, illustrated, respectively. It also enters branch conduit 86, shifting valve spool 141 of valve 110 to the left, connecting port 107 with port 148 and blocking ports 140 and 142.

The pump delivery is now directed through conduit 108, ports 107 and 148 of valve 110, and conduit 150 to the head end of the cylinder 132. As valve 116 is in run position, that is, valve spool 117 thereof being to the left connecting ports 122 and 126, the working pressure is directed also through conduit 114 to conduit 130, to the rod end of the cylinder 132, forming a differential action and causing the piston 152 to return to the starting position, that is, to the right.

If the need arises to stop the slide 50 during this cycle, lever 123 of valve 116 is pushed inward to the stop position, illustrated, connecting port 120 with port 124, again directing the pump delivery to conduit 98, causing it to circulate at no pressure, while port 126 connects with port 136, diverting the discharging fluid from conduit 130 to conduit 138, entering valve 110 at ports 140 and 142. The latter being blocked, spool 141 being to the left, causes the slide 50 to immediately stop. Because of this sudden stop plus the inertia of the table 50, the excess pressure built up in conduit 130 is bypassed over the relief valve 134.

When the slide 50 reaches the end of its return stroke, the cam 52 mounted thereon will shift the pilot valve 24, providing for a feed stroke, hereinbefore described, continuing the oscillation until the start and stop valve 116 is shifted to the stop position.

Thus it will be seen that the invention provides a means of driving a reciprocating mechanism, stopping the same promptly in either direction, and utilizes a considerably simplified circuit incorporating a relief valve which limits the working pressure and also acts as a safety valve during the braking operation, relieving excess pressure caused by the inertia of the slide.

While the form of embodiment of the invention as herein disclosed constitutes a preferred form, it is to be understood that other forms might be adopted, all coming within the scope of the claims which follow.

What is claimed is as follows:

1. In a hydraulic power transmission for operating an alternately reversing load device, the combination with a source of pressure fluid, a differential fluid motor for operating the load device by fluid supplied from said source, a reverse valve for selectively directing fluid to, or exhausting the large area of the motor, a run-stop valve for selectively bypassing the source or blocking such bypass and concurrently respectively blocking or supplying fluid from the source to the small area of the motor including a connection beyond the reverse valve to exhaust the differential volume from the large area of the cylinder while the small area is being supplied with fluid, and a circuit connecting the source, motor and valves including a connection from the small area of the motor and through said run-stop valve to the reverse valve and established by the run-stop valve in its stop position to hydraulically brake the motor in either position of the reverse valve.

2. In a hydraulic power transmission for operating an alternately reversing load device, the combination with a source of pressure fluid, a differential fluid motor for operating the load device by fluid supplied from said source, a reverse valve for selectively directing fluid to, or exhausting the large area of the motor, a run-stop valve for selectively bypassing the source or blocking such bypass and concurrently respectively blocking or supplying fluid from the source to the small area of the motor including a connection beyond the reverse valve to exhaust the differential volume from the large area of the cylinder while the small area is being supplied with fluid, and a circuit connecting the source, motor and valves including a connection from the small area of the motor and through said run-stop valve to the reverse valve and established by the run-stop valve in its stop position to hydraulically brake the motor in either position of the reverse valve, said connection including a pressure responsive relief valve for limiting the maximum pressure built up in said connection by the inertia of the load device during stopping.

3. In a hydraulic power transmission for operating an alternately reversing load device, the combination with a source of pressure fluid, a differential fluid motor for operating the load device by fluid supplied from said source, a reverse valve for selectively directing fluid to, or exhausting the large area of the motor, a run-stop valve for selectively controlling the supply of fluid to the small area of said motor or stopping the same including a connection beyond the reverse valve to exhaust the differential volume from the large area of the cylinder while the small area is being supplied with fluid, and a circuit connecting the source, motor and valves including a connection through said valves and establishing, when the run-stop valve is in stopping position and the reverse valve is in large area exhausting position, communication between the large and small areas of the motor.

4. In a hydraulic power transmission for operating an alternately reversing load device, the combination with a source of pressure fluid, a differential fluid motor for operating the load device by fluid supplied from said source, a reverse valve for selectively directing fluid to, or exhausting the large area of the motor, a run-stop valve for selectively controlling the supply of fluid to the small area of said motor or stopping the same including a connection beyond the reverse valve to exhaust the differential volume from the large area of the cylinder while the small area is being supplied with fluid, a circuit connecting the source, motor and valves including a connection through said valves and establishing, when the run-stop valve is in stopping position and the reverse valve is in large area exhausting position, communication between the large and small areas of the motor, and a relief valve in said circuit effective to limit the pressure built up by the inertia of the motor when such communication is suddenly established.

5. In a hydraulic power transmission for operating an alternately reversing load device, the combination with a source of pressure fluid, a differential fluid motor for operating the load device by fluid supplied from said source, a reverse valve for selectively directing fluid to, or exhausting the large area of the motor, a run-stop valve for selectively controlling the supply of fluid to the small area of said motor or stopping the same including a connection beyond the reverse valve to exhaust the differential volume from the large area of the cylinder while the small area is being supplied with fluid, a circuit connecting the source, motor and valves including a connection through said valves and establishing, when the run-stop valve is in stopping position and the reverse valve is in large area exhausting position, communication between the large and small areas of the motor, and means associated with the reverse valve for blocking exit of fluid from the small area through said connection when the reverse valve is in the position to direct fluid to the large area and the run-stop valve is in stopping position.

6. In a hydraulic power transmission for operating an alternately reversing load device, the combination with a source of pressure fluid, a differential fluid motor for operating the load device by fluid supplied from said source, a reverse valve for selectively directing fluid to, or exhausting the large area of the motor, a run-stop valve for selectively controlling the supply of fluid to the small area of said motor or stopping the same including a connection beyond the reverse valve to exhaust the differential volume from the large area of the cylinder while the small area is being supplied with fluid, a circuit connecting the source, motor and valves including a connection through said valves and establishing, when the run-stop valve is in stopping position and the reverse valve is in large area exhausting position, communication between the large and small areas of the motor, means associated with the reverse valve for blocking exit of fluid from the small area through said connection when the reverse valve is in the position to direct fluid to the large area and the run-stop valve is in stopping position, and a relief valve in said connection effective to limit the pressure built up in said connection when the run-stop valve is suddenly shifted while the motor is traveling in either direction.

ROBERT A. SHARTLE.

REFERENCES CITED

The following references are of record in the file of this patent:

UNITED STATES PATENTS

| Number | Name | Date |
|---|---|---|
| Re. 21,963 | Harrington | Dec. 2, 1941 |
| 2,072,563 | Lynch et al. | Mar. 2, 1937 |
| 2,078,749 | Wood | Apr. 27, 1937 |
| 2,254,103 | Douglas | Aug. 26, 1941 |
| 2,259,636 | Harrington | Oct. 21, 1941 |
| 2,267,177 | Twyman | Dec. 23, 1941 |